Dec. 24, 1940.     I. BJORNSON     2,226,155

PIE DISH

Filed April 27, 1937     3 Sheets-Sheet 1

INVENTOR.
Ingvard Bjornson
BY
Gifford, Scull & Burgess
ATTORNEYS.

Dec. 24, 1940.   I. BJORNSON   2,226,155
PIE DISH
Filed April 27, 1937   3 Sheets-Sheet 2
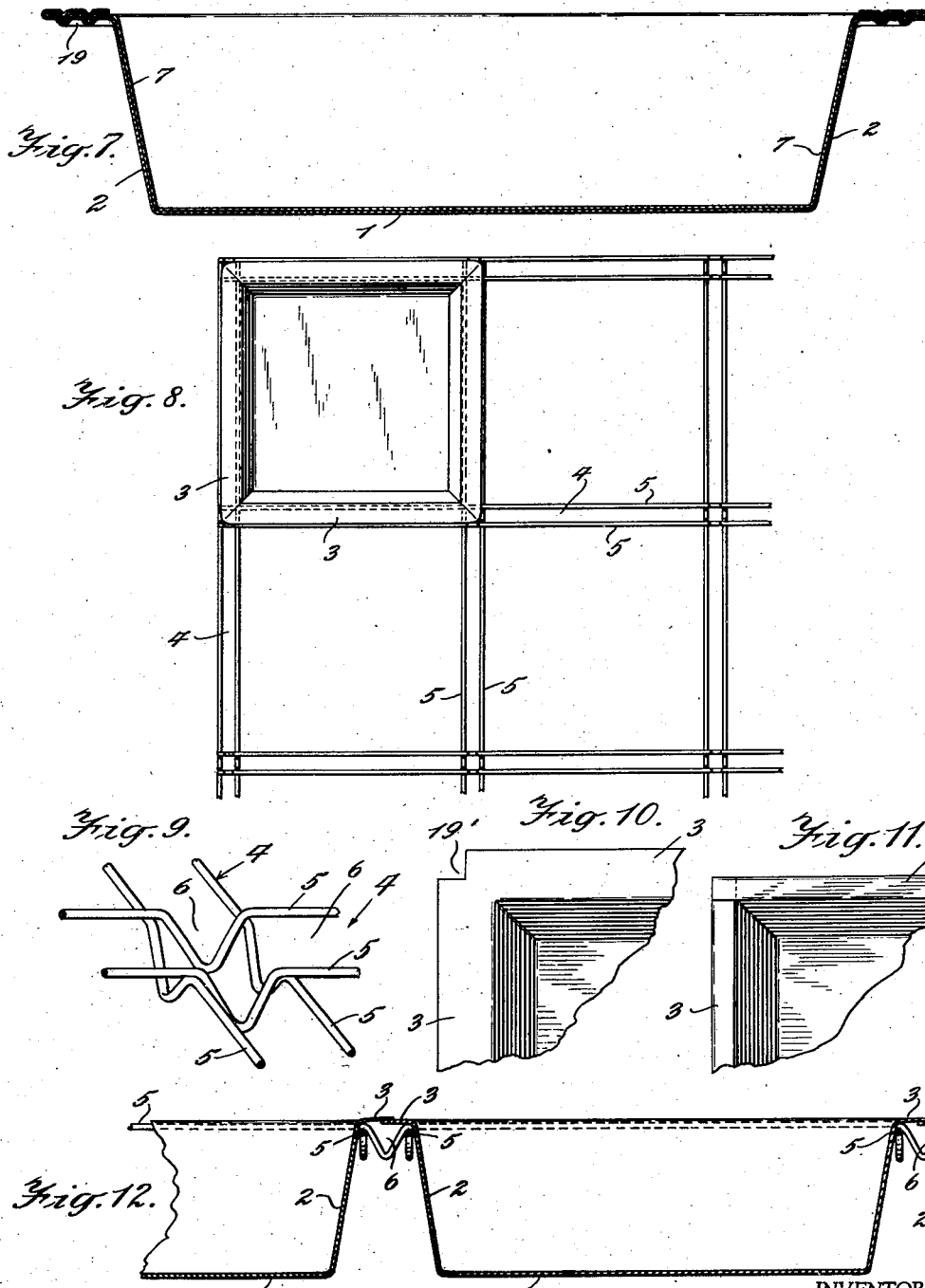
INVENTOR.
Ingvald Bjornson
BY
Gifford, Scull & Burgess
ATTORNEYS.

Dec. 24, 1940.  I. BJORNSON  2,226,155
PIE DISH
Filed April 27, 1937  3 Sheets-Sheet 3
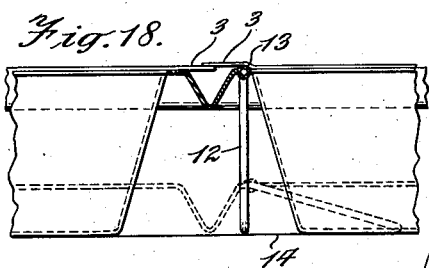
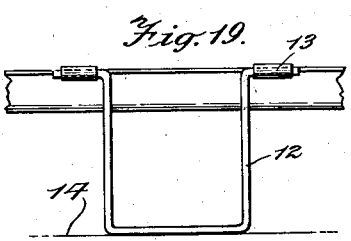
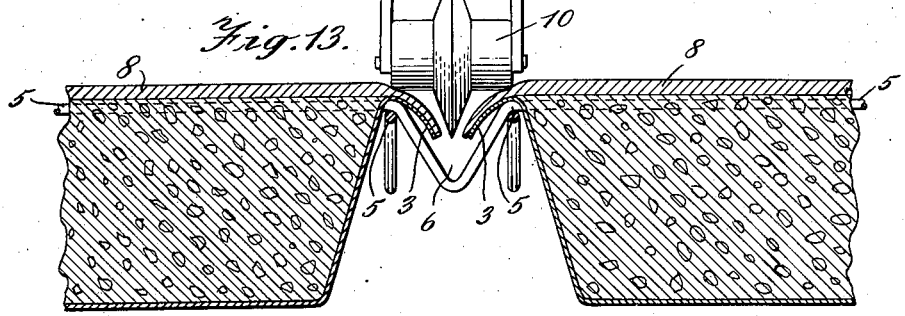
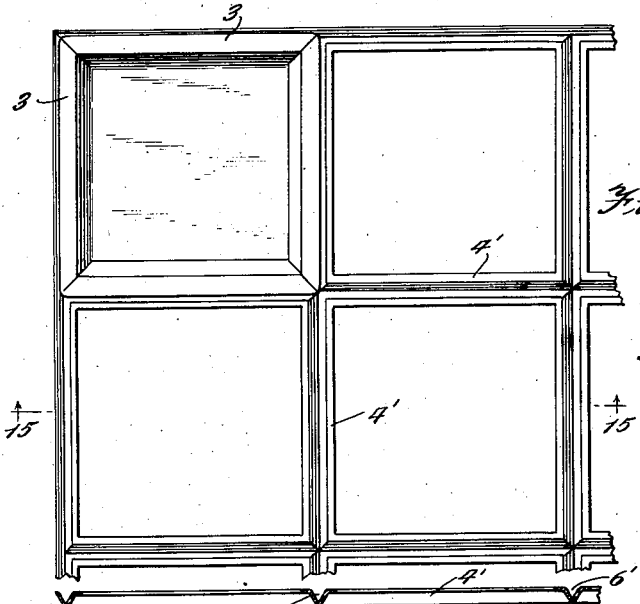
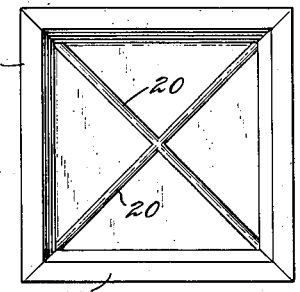
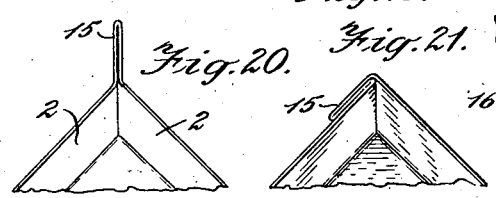
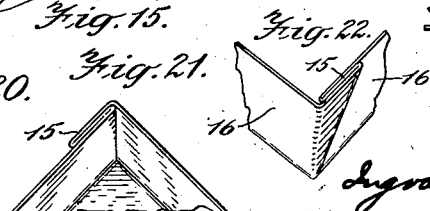
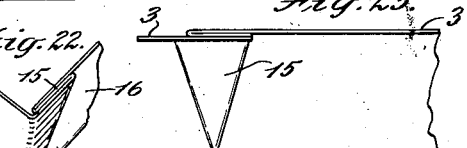
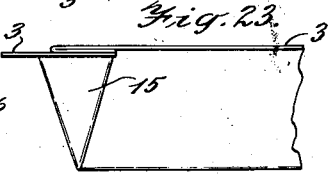
INVENTOR.
Ingvard Bjornson
BY
Gifford, Scull & Burgess
ATTORNEYS.

Patented Dec. 24, 1940

2,226,155

UNITED STATES PATENT OFFICE 2,226,155

PIE DISH

Ingvard Bjornson, New York, N. Y.

Application April 27, 1937, Serial No. 139,164

6 Claims. (Cl. 53—6)

This invention relates to novel and improved pie dishes. The novel features will be best understood from the following description and the annexed drawings, in which.

Figure 1:
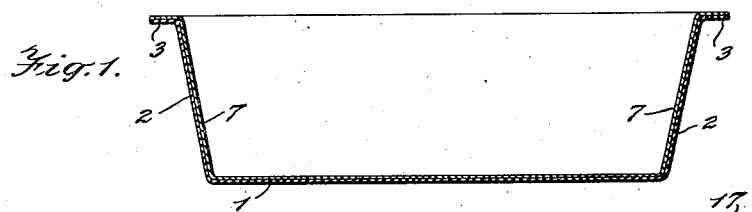
Fig. 1 is a vertical sectional view through one form of pie dish which may be used with the invention.
Figure 2:
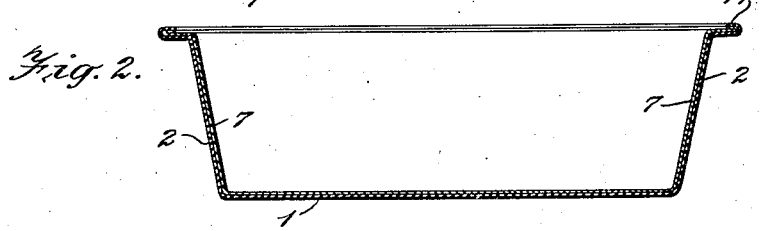
Fig. 2 is a view similar to Fig. 1 but showing a different embodiment of pie dish.
Figure 3:
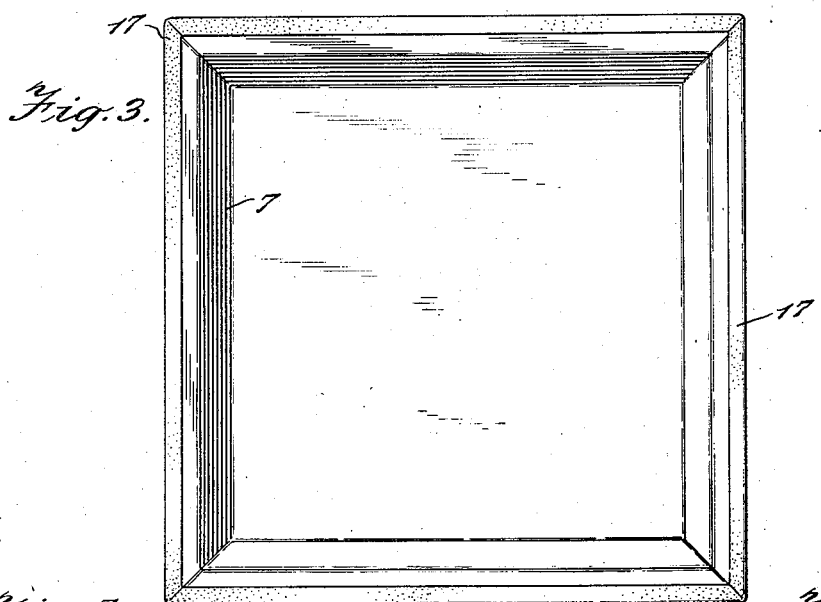
Fig. 3 is a plan of the dish appearing in Fig. 2.
Figures 4, 5:
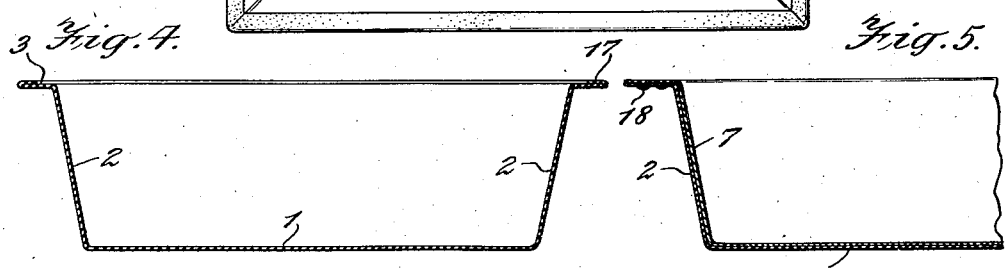
Figure 6:

Figs. 4 and 5 are views similar to Figs. 1 and 2 but showing still other forms, Fig. 5 being a section on the line 5—5 of Fig. 6;

Fig. 6 is a fragmentary view of the structure appearing in Fig. 5;

Fig. 7 is still another view similar to Fig. 1 and showing still another form of dish construction;

Fig. 8 is a plan view of part of a rack which may be used in the practice of the invention;

Fig. 9 is a perspective view of one of the corners formed by the intersecting supports forming the rack of Fig. 8;

Figs. 10 and 11 are fragmentary views illustrating certain details of construction of a pie dish according to this invention;

Fig. 12 is a vertical sectional view through a portion of a rack having pie dishes suspended therein;

Fig. 13 is a view on an enlarged scale and on the same plane as Fig. 12 and illustrating a step in the method;

Fig. 14 is a view corresponding to Fig. 8 but showing a different embodiment of the rack;

Fig. 15 is a section on the line 15—15 of Fig. 14;

Fig. 16 is a perspective view corresponding to Fig. 9 but showing a different form of construction;

Fig. 17 is a view on a smaller scale corresponding generally to Fig. 3 but showing a different embodiment;

Figs. 18 and 19 are views illustrating a detail of construction of the rack;

Figs. 20, 21, 22, and 23 are fragmentary views illustrating a detail of construction of the pie dish.

As is well known, pies are usually made in round pie plates or dishes in which the pie filling is inserted and covered with dough, usually each pie being treated as an individual unit. Small individual pies have been baked, and usually these are also baked in round plates or dishes. Sometimes these individual pies are sold in non-metallic dishes of the kind usually called "paper," in which case they must be removed from the dishes in which they are baked and placed in the dishes in which they are sold.

According to this invention, a plurality of pies may be baked simultaneously in dishes which are of heat-conducting material suitable for baking pies therein, but which nevertheless can be readily separated from the pie when it is to be eaten and may be crumpled up and thrown away, thus obviating the necessity of disposing of stiff metal plates or, in the alternative, the step of transferring a baked pie from its baking dish to a selling dish. In other words, according to this invention, the pie is baked and sold in the one container from which it may be eaten, and the container is of a construction which can be easily disposed of.

For the purpose of convenience, I have used and shall use the word "pie," although it is to be understood that this word is employed to refer to any article of food to which the invention is applicable.

Preferably, the pie dishes are formed of metal foil of known construction, such for example as aluminum foil, and provided with outwardly extending flanges. For example, in the embodiment illustrated in Fig. 4, the dish comprises a bottom 1, side walls 2, and flanges 3. The details of construction will be referred to later. The dishes may be supported in a rack, such as shown in Figs. 8 and 14, which comprises a plurality of intersecting supports 4, here shown as defining square openings, although the shape of these openings may obviously be varied widely without departing from the invention. For convenience, however, each support may be straight and define sides of a large number of openings, such as square, triangular or other convenient shapes.

Referring to Fig. 9, it will be seen that the specific form of support shown comprises two wires 5 spaced apart so as to provide therebetween a space 6 which may be considered as a recess or groove in the support, and where two supports intersect, the wires are bent downwardly, as indicated in Fig. 9. The dishes are then assembled, as shown in Figs. 8 and 12, with the flanges 3 preferably overlapping each other above the recesses 6 in the supports. The supports will contact with the dishes closely adjacent the walls 2 of the dishes, and the supports are preferably so arranged that the dishes will be suspended from the supports. Thus it will be seen that when a large number of dishes are supported in a rack, there is no opening through which anything may drop, since the flanges of adjacent dishes all overlap.

The filling material for the pies may now be placed in the dishes in the rack, and this may conveniently be done because of the overlapping of the flanges, as just noted above. If found more suitable, the dishes may be filled before being placed in the rack, but the rack construction lends itself nicely to filling the dishes after they are in the rack. The filling may be deposited directly on the foil of the dish or on a suitable lining 7, for example, of vegetable parchment paper or any other suitable material in which food may be baked. Furthermore, if desired, a bottom crust may be used extending merely over the bottom of the dish with or without the lining, or this bottom crust may extend up the side walls, if desired. Ordinarily, in baking pies with a bottom crust, it has been customary to extend that crust over the edge of the dish onto its flange so as to aid in forming a seal between the bottom crust and the top one. According to my invention, however, as will be explained later, it is not necessary to have the bottom crust thus extend over the flange of the dish, which thus avoids the use of a large amount of dough at this point. When the bottom crust is used solely in the bottom of the dish, it may be conveniently formed of cracker crumbs, this type of crust being much more satisfactory with pies baked according to this invention.

After the filling is in the dishes, I then lay over the fillings a ribbon or sheet 8 of dough, which may be continuous over a large number of pies because they are placed in close juxtaposition and, as noted above, there is no opening to interrupt the continuity of the surface over which the sheet is laid. After the sheet of dough is in place, it may be severed along the lines between adjacent dishes by means of a suitable tool, one form of which is shown in Fig. 13 as comprising a cutter 9 rigid with a roller 10 adapted to engage the dough on opposite sides of the cutter. The tool may be operated by a handle 11 so that, as it passes along a support, the cutter will sever the dough above the recess 6 and force the dough down into engagement with the adjacent flanges 3 and will cause these flanges to separate and bend downwardly. Of course, it is to be understood that any other suitable form of tool may be used for the purpose just described.

The rack with the plurality of pies thereon may now be inserted into any suitable oven, and there the pies may be baked. No oven has been illustrated herein, because the invention may be practiced with any kind of oven which is found desirable. Preferably, however, the rack is supported on collapsible legs 12 which may be hinged to the rack at 13 so that the dishes are suspended from the rack. The legs here are shown as contacting with a shelf 14 of an oven with which the bottoms of the dishes substantially contact, although this arrangement may of course be varied as desired. It will be seen, however, that when the legs are collapsed as shown in dotted lines in Fig. 18, the dishes may then be readily removed from the rack, the rack resting upon the floor.

A form of dish which is particularly suited to the above method is one made of metal foil, as noted above. Such material conducts heat adequately for baking purposes and at the same time withstands the effect of heat so as to preserve the shape of the pie, if the dish is properly constructed. At the same time, the pie may be readily eaten from the dish, and the dish thrown away. The metal foil is a material which can be made into a dish which is attractive in appearance and yet it can be readily crumpled up and discarded after the pie is eaten.

A dish may be made from a single blank of foil which may be bent upwardly to form the vertically extending walls 2 and, as indicated in Fig. 20, two of the adjacent walls may be provided with a fold 15 which may then be again folded to the position indicated in Fig. 21. This construction in itself materially stiffens the corners of the dish and forms in effect posts or corners which serve to support the intervening walls. Any foil without some such strengthening would probably not maintain its form, but with this construction even a lighter foil may be used. After the corner is folded as indicated in Fig. 21, then the walls are preferably bent along the lines indicated at 16 to form the outwardly extending flanges 3, and it will be seen that this outward bending includes the fold 15 and serves to lock the fold to a sufficient extent to prevent accidental unfolding thereof. The flanges also materially strengthen and stiffen the walls and the corners. At the same time, the corner may be unfolded when the pie is being eaten, if desired.

The flange may be still further strengthened by folding back the flange 3, as indicated at 17 in Figs. 2 and 4. In Fig. 1, I have shown a plain lining 7 placed in a dish without any folded back flange, and this form may be used if desired. However, I prefer folding back the edge, as indicated at 17, so as to embrace the edge portion of the lining. Alternately, as shown in Figs. 5 and 6, the flange may be strengthened by corrugations 18 which may also be formed simultaneously in the lining 7. The corrugations also form a suitable rough base for the crust to which the crust may adhere. In Fig. 7 is shown a similar construction in which the corrugations are formed in a flange 19 in which the lining 7 has its edges disposed within a folded over flange.

As shown in Figs. 10 and 11, preferably when the edge portions of a flange are folded over, the corner formed by two intersecting flanges are preferably removed, as indicated at 19', so that the flange may be easily folded in to the position shown in Fig. 11.

In Fig. 17 is shown a slight modification in which the bottom of the dish is provided with corrugations 20 which will aid in stiffening the dish if found desirable. However, for most purposes it will be found that the foil, particularly when it is formed into a dish in the manner described above, will be sufficiently strong without these corrugations.

In Figs. 14 and 16 I have shown a different form of rack in which the supports 4', instead of being in the form of wires are in the form of strips of metal with recesses 6' formed therein by a suitable forming operation. These recesses may take the form of sharp angled grooves shown in Fig. 15 or the partially cylindrical form shown in Fig. 16.

When the cutting operation is performed on the dough in some such manner as indicated in Fig. 13, it will be seen that the dough is pressed into close contact with the two flanges 3, and these flanges are also depressed or bent downwardly into the recesses 6 so as to reach some such position as shown in Fig. 13. The flanges are thus in effect partially rolled around the wires 5 forming the support and thus the flange is materially strengthened. This also improves the appearance of the product in that no raw edge of metal is presented to the eye. The thickness of the dough is also materially reduced, which also improves the appearance.

Where a flange is used with a folded back edge as shown, for example, in Fig. 2, the flange is also materially increased in strength, and where the fold also embraces the edge of the lining it serves to protect the lining against the effect of heat during baking. It also effectively holds the lining in place.

While I have shown certain details of my method and certain details of apparatus with which it may be practiced, it is to be understood that these are merely illustrative and may be varied without departing from the invention as defined by the appended claims.

I claim:

1. A pie dish formed of metal foil folded to form the corners between vertically extending walls, whereby upon unfolding of said corners ready access to the contents of the dish is provided, said walls having outwardly extending flanges at the upper edges thereof, and a lining disposed in said dish and extending outwardly on top of said flanges, the edges of said flanges being folded back over said lining.

2. A pie dish f metal foil formed with folds to provide corners between vertically extending walls, the upper edge portions of said walls and folds being bent outwardly to form flanges, a second set of folds at the overlapping corners of said flanges locking said folds against accidental unfolding and increasing the strength of the corners.

3. A pie dish of metal foil formed with folds to provide corners between vertically extending walls, the upper edge portions of said walls and folds being bent outwardly to form flanges, a second set of folds at the overlapping corners of said flanges locking said folds against accidental unfolding and increasing the strength of the corners, and a lining disposed in said dish and having its edge portions lying on top of said flanges and being placed in position so as to lie within all of said folds.

4. A pie dish formed of metal foil folded to form corners between vertically extending walls, said walls having outwardly extending flanges at their upper edges, said flanges overlapping each other at the corners and being folded to interlock with each other.

5. A pie dish formed of metal foil folded to form corners between vertically extending walls, said walls having outwardly extending flanges at their upper edges, said flanges overlapping each other at their ends and being uncut and folded to form interlocking joints at their ends.

6. A pie dish formed of metal foil folded to form corners between vertically extending walls, said walls having outwardly extending flanges at their upper edges, said flanges being capable of receiving crust over their upper surfaces and being capable of being bent downwardly when said crust is applied, the corners of said flanges overlapping each other and being folded to interlock with each other.

INGVARD BJORNSON.